(12) United States Patent
Ben-Sinai et al.

(10) Patent No.: US 11,075,665 B2
(45) Date of Patent: Jul. 27, 2021

(54) EFFICIENT CONCURRENT MULTICHANNEL DISCOVERY AND RECEPTION

(71) Applicant: Intel Corporation, Santa Clara, CA (US)

(72) Inventors: Elkana Ben-Sinai, Raanana (IL); Oz Micka, Kiryat-Ono (IL); Sharon Heruti, Tel Aviv (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/042,080

(22) PCT Filed: Jun. 28, 2018

(86) PCT No.: PCT/US2018/039920
§ 371 (c)(1),
(2) Date: Sep. 25, 2020

(87) PCT Pub. No.: WO2020/005245
PCT Pub. Date: Jan. 2, 2020

(65) Prior Publication Data
US 2021/0119664 A1    Apr. 22, 2021

(51) Int. Cl.
*H04B 1/401* (2015.01)
*H04W 88/06* (2009.01)
(Continued)

(52) U.S. Cl.
CPC ............ *H04B 1/401* (2013.01); *H04B 1/406* (2013.01); *H04W 48/16* (2013.01); *H04W 88/06* (2013.01)

(58) Field of Classification Search
CPC .......... H04B 1/401; H04B 1/406; H04B 1/16; H04W 48/16; H04W 88/06
See application file for complete search history.

(56) References Cited

U.S. PATENT DOCUMENTS

2011/0299618 A1    12/2011  Hammerschmidt et al.
2017/0063427 A1     3/2017  Lee et al.
(Continued)

OTHER PUBLICATIONS

International Search Report and Written Opinion for PCT/US2018/039920, dated Mar. 8, 2019, 7 pages.
(Continued)

*Primary Examiner* — Nguyen T Vo
(74) *Attorney, Agent, or Firm* — Eversheds Sutherland (US) LLP

(57) ABSTRACT

This disclosure describes systems, methods, and devices related to efficient concurrent multichannel discovery and reception. A device may determine high performance communications circuitry and low performance communications circuitry within a first component of the device. The device may determine one or more high power radio frequency (RF) chains associated with at least one of a high frequency band or a low frequency band. The device may determine one or more low power RF chains associated with at least one of the high frequency band or the low frequency band. The device may perform a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

20 Claims, 7 Drawing Sheets

(51) Int. Cl.
*H04W 48/16* (2009.01)
*H04B 1/403* (2015.01)

(56) References Cited

U.S. PATENT DOCUMENTS

| | | |
|---|---|---|
| 2017/0325169 A1 | 11/2017 | Emadi et al. |
| 2017/0353226 A1 | 12/2017 | HomChaudhuri et al. |
| 2018/0063742 A1* | 3/2018 | Jia .................. H04W 52/028 |
| 2018/0232036 A1* | 8/2018 | Varadarajan .......... G06F 1/3287 |

OTHER PUBLICATIONS

Pengfei Zhang et al., 'A 5-GHz Direct-Conversion CMOS Transceiver', in: IEEE Journal of Solid-St at e Circuits (vol. 38, Issue: 12), pp. 2232-2238, Dec. 2003, See section IV.

* cited by examiner

EFFICIENT CONCURRENT MULTICHANNEL DISCOVERY AND
RECEPTION

CROSS-REFERENCE TO RELATED APPLICATION(S)

This application is a U.S. National Stage Application under 35 U.S.C. 371 and claims the priority benefit of International Application No. PCT/US2018/039920, filed Jun. 28, 2018, the disclosures of which are incorporated herein by reference as if set forth in full.

TECHNICAL FIELD

This disclosure generally relates to systems and methods for wireless communications and, more particularly, to efficient concurrent multichannel discovery and reception.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
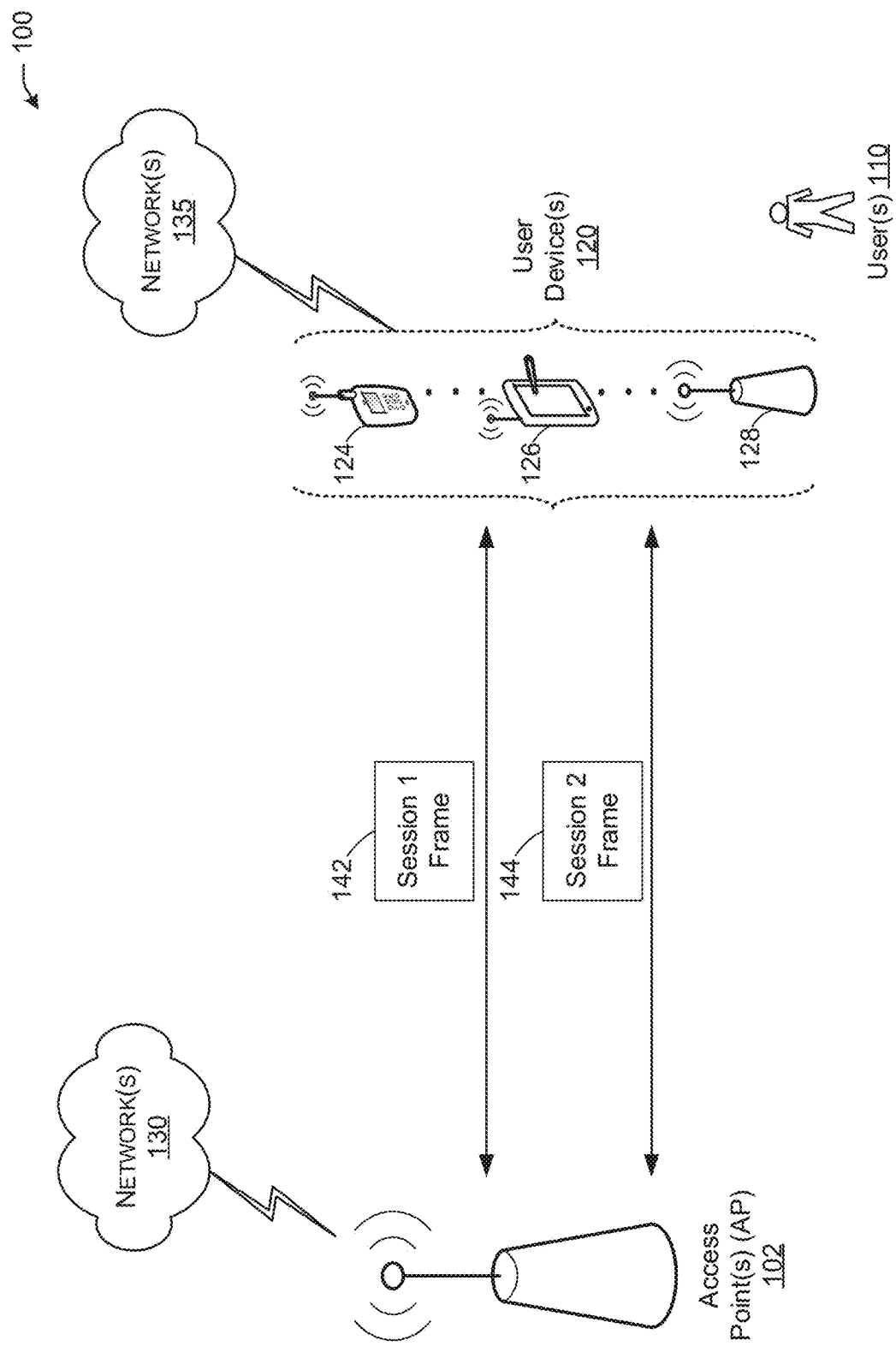
FIG. 1 depicts a network diagram illustrating an example network environment for efficient concurrent multichannel discovery and reception, in accordance with one or more example embodiments of the present disclosure.

Example embodiments described herein provide certain systems, methods, and devices for efficient concurrent multichannel discovery and reception.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As concurrent usages for Wi-Fi increases, there is a need for the provision of good user experiences for these concurrent usages. For example, there is an increasing requirement for a user to be able to engage in both intra-band concurrency (e.g., a plurality of concurrent communication sessions in the same frequency band, such as a 2.4 gigahertz (GHz) frequency band or a 5 GHz frequency band) and in inter-band concurrency (e.g., a plurality of concurrent communication sessions in different frequency bands, such as a first communication session in a 2.4 GHz frequency band and a second communication session in a 5 GHz frequency band). In addition, the market requires a solution that has the characteristics of low power consumption (e.g., for longer battery life usage) and of a small Silicon solution form factor.

Existing solutions for concurrent usages have typically employed one of two alternatives. A first of these alternatives is traditional dual band concurrency. Traditional dual band concurrency uses two devices within a device (e.g., two physical layer (PHY) entities and two associated media access control layer (MAC) entities) in order to provide the required concurrency at different band. A second of these alternatives is use of a time division multiplexing (TDM) operation. A TDM operation uses a single device (e.g., a single PHY entity and associated MAC entity, collectively called a PHY/MAC, a PHY/MAC engine, a PHY/MAC device, and/or communications circuitry) that serves both a primary Wi-Fi connection and allows concurrent usage using TDM.

However, each of these existing solutions includes limitations. Traditional dual band concurrency is limiting in that this existing solution 1) requires an added Silicon footprint and 2) includes limited concurrency capabilities. For example, traditional dual band concurrency enables only inter-band concurrency and cannot allow intra-band concurrency (in either the 2.4 GHz band or in the 5 GHz band). Employing a TDM operation is limiting in that this existing solution results in a degraded user experience, for example with respect to lower throughput, a higher latency burden upon leaving a channel and/or communication session, and/or one or more interoperability issues. The existing concurrent dual band solution enables concurrency only between different bands, thus not eliminating the need for the TDM solution (e.g., in a situation wherein same band concurrency is required). Furthermore, the existing dual band solution is expensive in terms of requiring a duplication of the various hardware components (e.g., components associated with PHY/MAC entities and/or radio frequency (RF) chains) in order to support full independent concurrency. In the existing concurrent dual band solution, there is a limitation on intra-band concurrency operations, such as dynamic frequency selection (DFS) master, which requires long radar detection in a DFS channel in parallel to a 5 GHz basic service set (BSS) connection. Because of these limitations, the existing TDM solution only enables limited and/or rare concurrency operations, such as infrequent scans or limited peer to peer activity (e.g., mainly due to the interoperability issues that occur when frequently leaving the operating channel and indicating to the AP/peers of power save).

Example embodiments of the present disclosure relate to systems, methods, and devices for efficient concurrent multichannel discovery and reception.

In one embodiment, the solutions described herein allow low power discovery concurrent to regular operation within the same band and/or within a different band using two MAC/PHY devices and a minimal RF Silicon footprint. The solution allows two MAC/PHY devices to dynamically connect to four RF lineups: two high performance RF lineups, including a two by two (2×2) low band (LB) RF chain and a 2×2 high band (HB) RF chain) and two low power single chain receive-only RF lineups, including a low power LB chain and a low power HB chain. The solution allows both inter-band dual concurrency and intra-band dual concurrency with a small Silicon footprint and low power consumption in the required use case while maintaining a good user experience.

In one embodiment, the present solution allows for greater flexibility compared to prior dual concurrency systems. The present solution allows any dual concurrency, including both intra-band (e.g., two communication sessions in same band) or inter-band (one communication session in a 2.4 GHz frequency band and one communication session in a 5 GHz frequency band). The present solution allows continuous and/or continual concurrency with a minimal burden on battery power consumption and a good user experience. The present solution enables better battery life compared to prior dual concurrency systems. For example, the present system leverages the additional low power RF chains and flexible architecture to allow the system to always select the lowest power RF chain required by the specific usage scenario, even in non-concurrent use cases (e.g., use cases that require only a single PHY/MAC device, such as unassociated discovery). The present solution allows for a smaller Si footprint for the supported multi-concurrency modes.

In one embodiment, the present solution provides flexible hardware (HW) to enable a cost efficient, low power solution that enhances common use cases by supporting intra-band and inter-band concurrency without compromising user experience and performance (such as throughput, latency) and also while avoiding known interoperability issues (such as leaving a main connection channel).

In one embodiment, the present solution enables a dynamic selection between several RF chains in combination with two MAC/PHY devices. The present solution includes the following RF chains: 2×2 2.4 GHz RF high performance chains, 2×2 5 GHz RF high performance chains, a 2.4 GHz RF low power single receive-only chain, and a 5 GHz RF low power single receive-only chain. The present solution includes the following PHY/MAC devices: one wide bandwidth (BW) (e.g., up to 80 megahertz (MHz)) PHY/MAC device and one narrow BW (e.g., up to 20 MHz) PHY/MAC device.

In one embodiment, the present solution leverages that most of the required concurrency use cases include a device in an unassociated state (e.g., the device performs a concurrent operation that does not entail association with an AP), thus are less time critical by nature. The present solution also leverages that most required concurrency use cases need to support only legacy data receive rates (e.g., using a low modulation and coding scheme (MCS)) or only radar detection, thereby allowing a signal to noise ratio (SNR) trade-off. The present solution enables very low power operation for the discovery uses cases by reducing the requirements from the receive-only RF chains and by enabling the ability to transition from a low power state to an active state in the digital portion of the device (e.g., in the PHY/MAC devices).

In one embodiment, the 2.4 GHz RF low power single receive-only chain and the 5 GHz RF low power single receive-only chain differ from the high performance RF chains (e.g., from the 2×2 2.4 GHz RF high performance chains and the 2×2 5 GHz RF high performance chains) in the physical circuitry design.

In one embodiment, a device is optimized for dual concurrency by reducing phase noise and limiting the BW requirements of the concurrent use cases. This optimization allows for the limiting of RF capabilities of the device. For example, the RF capabilities of the device may be limited by including: a low power phase-locked loop (PLL), which allows phase noise to meet low legacy rates only; a low power crystal radio (XTAL) mode, which allows phase noise required for legacy rates only; and a reduced power analog to digital converter (ADC) mode, which is allowed in narrow BW operations and operations that require a low SNR for discovery.

In one embodiment, the present solution includes system level optimizations. For example, using a RF low power single receive-only chain allows a device to leverage a longer response time to allow deeper clock and power management, including clock gating, voltage adjustments, and power domain shut down. Additionally, the present solution allows a fast transition from a listen mode to an active mode, for example by using capabilities such as PLL fast lock and fast power domains recover. Due to the flexibility of design, the same mechanism may also be applied in non-concurrent use cases (e.g., in use cases that require a single PHY/MAC device) that require a long use period for low power discoverability, thus optimizing battery life in a single function (e.g., a scan).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 depicts a network diagram illustrating an example network environment of an efficient concurrent multichannel discovery and reception system, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
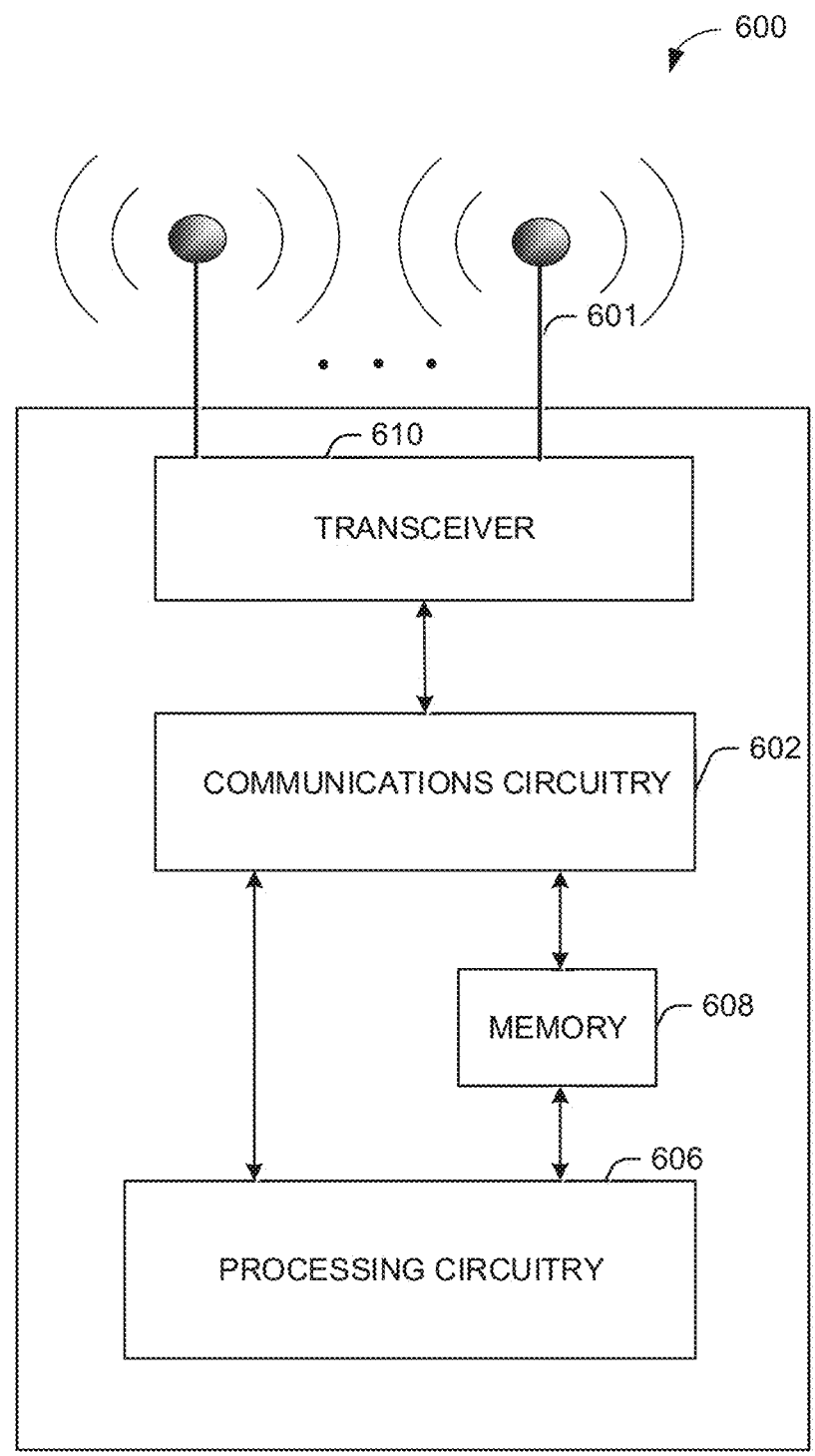
FIG. 6 depicts a functional diagram of an exemplary communication station that may be suitable for use as a user device, in accordance with one or more example embodiments of the present disclosure.
Figure 7:
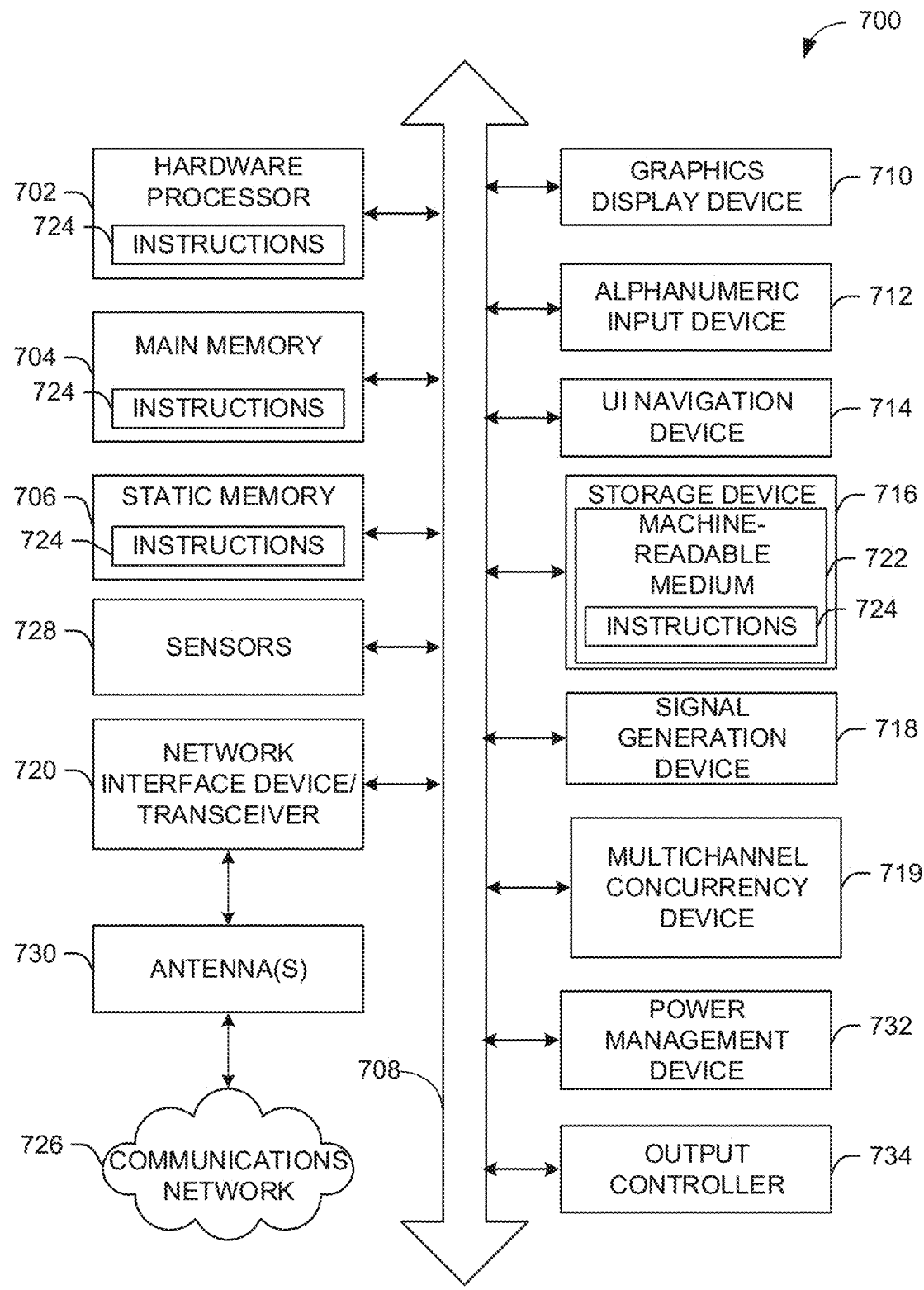
FIG. 7 depicts a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s)

102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), 6 GHz channels (e.g., 802.11ax or beyond), and/or 60 GHz channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, an AP 102 and/or user device(s) 120 may send a session 1 frame 142 during a first communication session and a session 2 frame 144 during a second communication session. It is understood that the above descriptions are for purposes of illustration and are not meant to be limiting.

Figure 2:
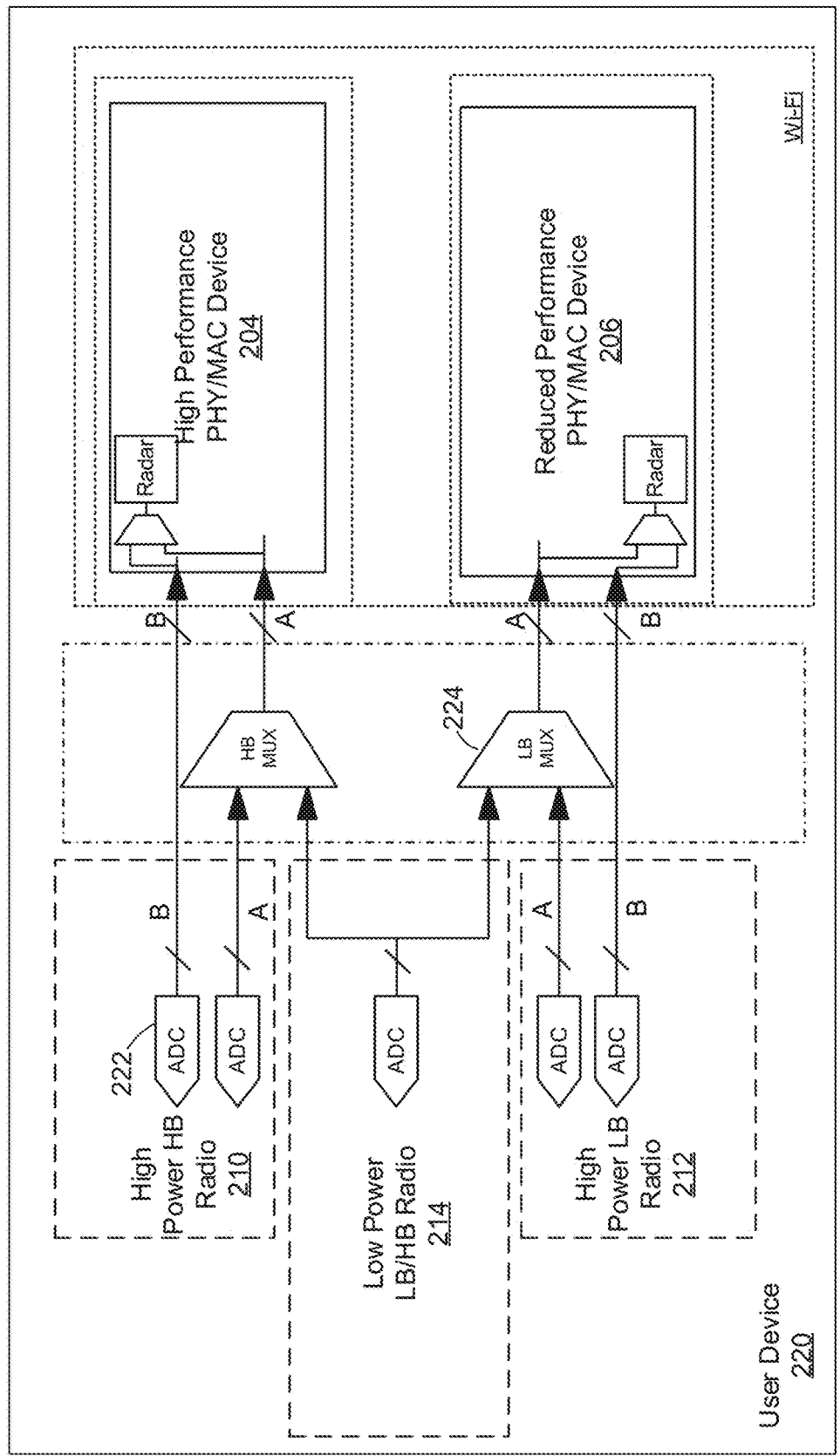
FIG. 2 depicts an illustrative schematic diagram for an efficient concurrent multichannel discovery and reception system, in accordance with one or more example embodiments of the present disclosure.

FIG. 2 depicts an illustrative schematic diagram for an efficient concurrent multichannel discovery and reception system, in accordance with one or more example embodiments of the present disclosure.

User device 220 may communicate in accordance with IEEE 802.11 communication standards. User device 220 may be a mobile device that is non-stationary (e.g., not having a fixed location) or may be a stationary device. Note that user device 220 may also be referred to herein as a STA.

In one embodiment, user device 220 may communicate with one or more neighbor devices (e.g., one or more APs and/or one or more other STAs). User device 220 may include a plurality of devices that facilitate communication via one or more communication sessions. User device 220 may include high performance PHY/MAC device 204 and reduced performance PHY/MAC device 206. A PHY/MAC device may include circuity required to implement physical layer and media access control layer functions. High performance PHY/MAC device 204 may be capable of wide BW communication (e.g., up to 80 MHz, such as one 80 MHz channel, two 40 MHz channels, four 20 MHz channels, and so on). Reduced performance PHY/MAC device 206 may be capable of narrow BW communication (e.g., up to 20 MHz, such as one 20 MHz channel).

In one embodiment, each PHY/MAC device (e.g., each of high performance PHY/MAC device 204 and reduced performance PHY/MAC device 206) may be capable of supporting a communication session on one or more channels. A communication session is an interactive information interchange between two or more communicating devices. For example, user device 220 may establish a first communication session using a first device (e.g., using high performance PHY/MAC device 204) and may establish a second communication session using a second device (e.g., using reduced performance PHY/MAC device 206). The first communication session and the second communication session may be established concurrently (e.g., at the same time and/or at overlapping times).

In one embodiment, user device 220 may include a plurality of radio chains (e.g., transceivers), such as High Power HB Radio 210 (which may include 2×2 5 GHz RF high performance chains), High Power LB Radio 212 (which may include 2×2 2.4 GHz RF high performance chains), and Low Power LB/HB Radio 214 (which may include a 2.4 GHz RF low power single receive-only chain and a 5 GHz RF low power single receive-only chain). High Power HB Radio 210 and High Power LB Radio 212 may each include two transmit (Tx) antennas and two receive (Rx) antennas (e.g., user device 220 includes two Tx antennas and two Rx antennas in each frequency band), which allows each high performance radio to establish two spatial streams with an AP. Low Power LB/HB Radio 214 may include a single Rx antenna for each frequency band. Each radio (e.g., each of High Power HB Radio 210, High Power LB Radio 212, and Low Power LB/HB Radio 214) may include one or more analog to digital converters (ADCs), such as ADC 222. ADC 222 allows an analog signal to be converted to a digital signal. User device 220 may also include one or more multiplexers (MUX), such as LB MUX 224. Each multiplexer may allow multiple analog and/or digital signals to be combined into one signal.

It is understood that the above descriptions are for purposes of illustration and are not meant to be limiting.

Figure 3:
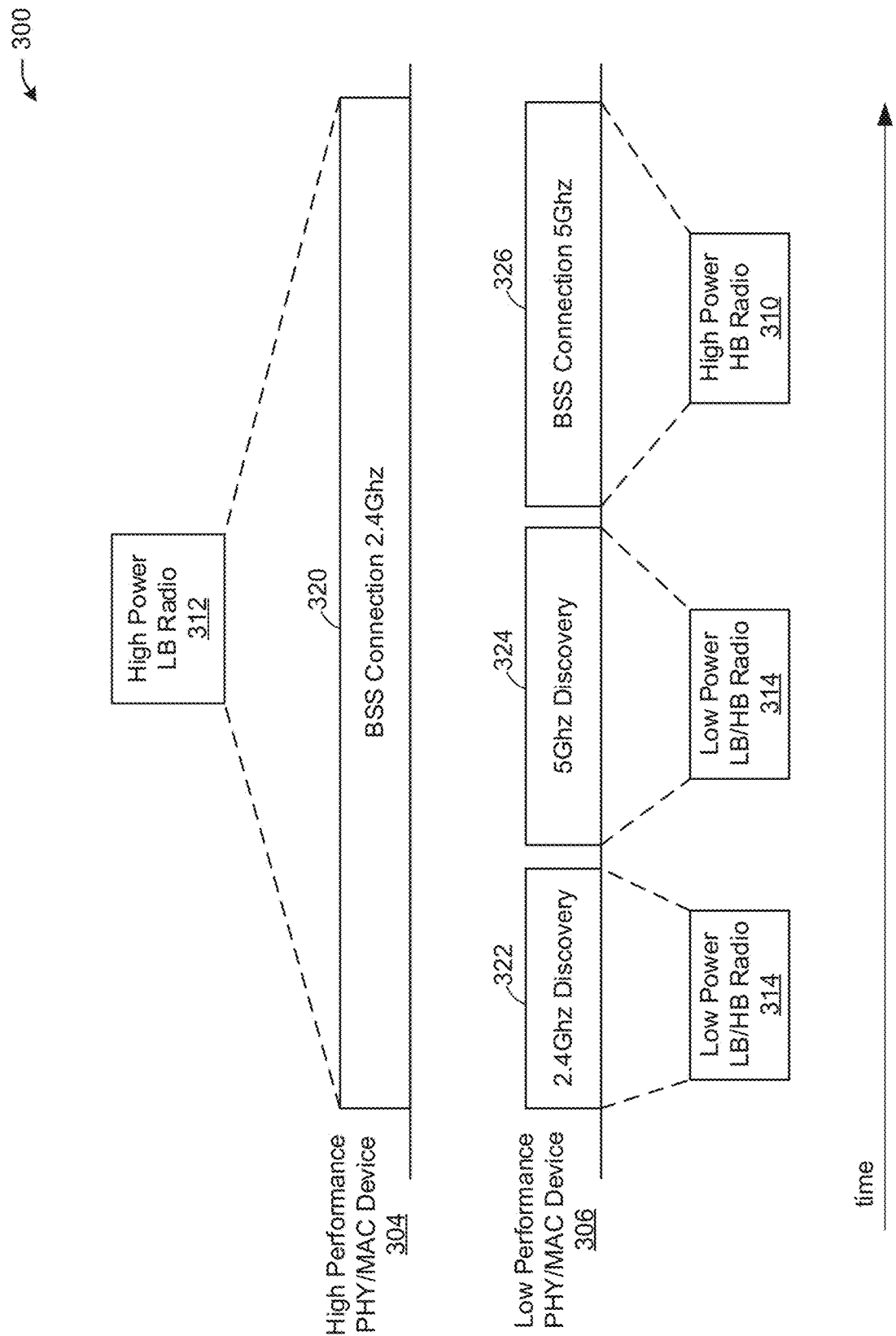
FIG. 3 depicts an illustrative schematic diagram for concurrent multichannel operations, in accordance with one or more example embodiments of the present disclosure.

FIG. 3 depicts an illustrative schematic diagram for concurrent multichannel operations, in accordance with one or more example embodiments of the present disclosure.

Referring to FIG. 3, there is shown a user device that comprises a first device (e.g., High Performance PHY/MAC Device 304, which may be similar to High Performance PHY/MAC Device 204 of FIG. 2) and a second device (e.g., Low Performance PHY/MAC Device 306, which may be similar to Reduced Performance PHY/MAC Device 206 of FIG. 2). The user device may be communicating using one or more multichannel operations (e.g., operations 320, 322, 324, and 326). These operations are illustrated over the time domain. For example, the user device may perform operation 320, which includes communicating during a first communication session using High Performance PHY/MAC Device 304. In the illustrated embodiment, operation 320 is a communication session that is a BSS Connection in the 2.4 GHz frequency band. The user device may communicate during operation 320 using a high power radio, such as High Power LB Radio 312, which may be similar to High Power LB Radio 212 of FIG. 2.

In one embodiment, concurrently with operation 320, the user device may determine to perform a concurrent operation using a second PHY/MAC device, such as Reduced Performance PHY/MAC Device 306, which may be similar to Reduced Performance PHY/MAC Device 206 of FIG. 2.

The concurrent operation may include one or more of a scan operation, a discovery operation, a radar detection operation, an automotive operation, and/or a soft AP operation. The scan operation includes the ability to find one or more neighboring APs and/or peers, for example to provide location information, to find candidates for roaming, and/or to find candidates for peer-to-peer interactions. The discovery operation includes making the concurrent device available for a certain time, for example to allow other Wi-Fi devices to discover the user device. The radar detection operation includes finding an alternative channel for operation, for example by performing a DFS master CAC operation. An automotive operation includes an ability to ensure minimal latency on a security channel in dedicated short-range communication (DSRC) while listen on lower time critical message on infra messages. A soft AP operation includes performing a best channel selection, for example by searching for an alternative channel that can provide better performance to associated devices.

In one embodiment, the user device may determine to perform operation 322 concurrently with operation 320. In the illustrated embodiment of FIG. 3, operation 322 includes performing a discovery operation in the 2.4 GHz frequency band. Operation 322 may be performed by Reduced Performance PHY/MAC 306. Operation 322 may be performed using a low power radio, such as Low Power LB/HB Radio 314, which may be similar to Low Power LB/HB Radio 214 of FIG. 2. The user device may determine to perform operation 324 concurrently with operation 320 (e.g., subsequent to operation 322). In the illustrated embodiment, operation 324 includes performing a discovery operation in the 5 GHz frequency band. Operation 324 may be performed by Reduced Performance PHY/MAC 306. Operation 324 may be performed using a low power radio, such as Low Power LB/HB Radio 314. The user device may determine to perform operation 326 concurrently with operation 320 (e.g., subsequent to operations 322 and 324). In the illustrated embodiment, operation 326 includes communicating in a communication session that is a BSS Connection in the 5 GHz frequency band. Operation 326 may be performed by Reduced Performance PHY/MAC 306. Operation 326 may be performed using a high power radio, such as High Power HB Radio 310, which may be similar to High Power HB Radio 210 of FIG. 2. Note that each of operations 322, 324, and 326 may be performed using Reduced Performance PHY/MAC 306 concurrently with operation 320 performed using High Performance PHY/MAC 304. The user device may determine which radio chain to use for each of operations 320, 322, 324, and 326 dynamically, depending on the determined operation (e.g., depending on the use case). For example, the user device (or a component of the user device, such as the communications circuity and/or the one or more PHY/MAC devices) may determine which RF chain(s) to use for each of operations 320, 322, 324, and 326, thereby taking advantage of the low power requirements of certain low power operations (e.g., one or more of the concurrent operations discussed above, including a scan operation, a discovery and/or discoverability operation, a radar detection operation, and/or an automotive operation).

It is understood that the above descriptions are for purposes of illustration and are not meant to be limiting.

Figure 4:
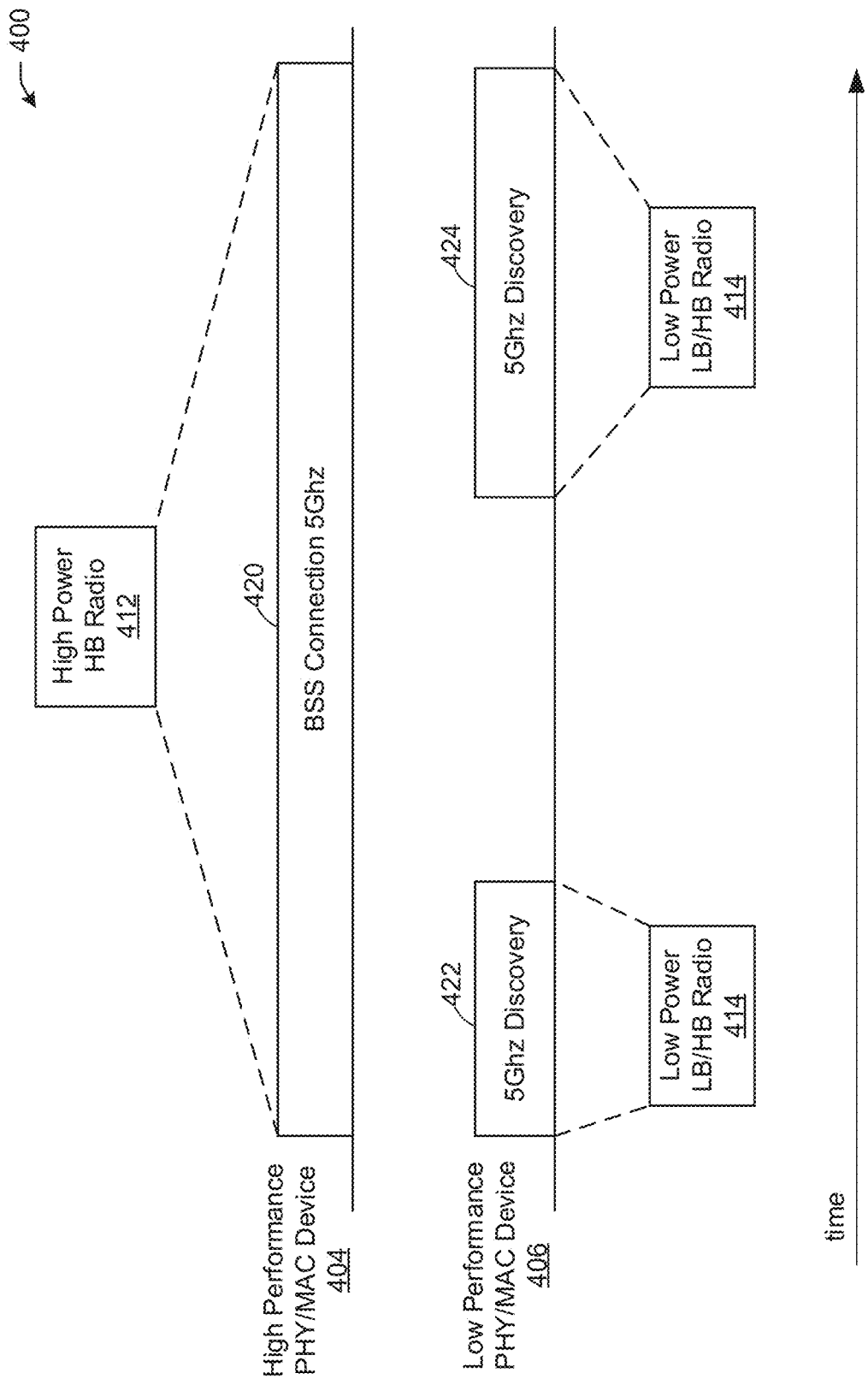
FIG. 4 depicts an illustrative schematic diagram for concurrent multichannel operations, in accordance with one or more example embodiments of the present disclosure.

FIG. 4 depicts an illustrative schematic diagram for concurrent multichannel operations, in accordance with one or more example embodiments of the present disclosure.

Referring to FIG. 4, there is shown a user device that comprises a first device (e.g., a High Performance PHY/MAC Device 404, which may be similar to High Performance PHY/MAC Device 204 of FIG. 2) and a second device (e.g., a Low Performance PHY/MAC Device 406, which may be similar to Reduced Performance PHY/MAC Device 204 of FIG. 2). The user device may be communicating using one or more multichannel operations (e.g., operations 420, 422 and 424). These operations are illustrated over the time domain. For example, the user device may perform operation 420, which includes communicating during a first communication session using High Performance PHY/MAC Device 404. In the illustrated embodiment, operation 420 is a communication session that is a BSS Connection in the 5 GHz frequency band. The user device may communicate during operation 420 using a high power radio, such as High Power HB Radio 412, which may be similar to High Power HB Radio 212 of FIG. 2.

In one embodiment, concurrently with operation 420, the user device may determine to perform a concurrent operation using a second PHY/MAC device, such as Reduced Performance PHY/MAC Device 406, which may be similar to Reduced Performance PHY/MAC Device 206 of FIG. 2. The concurrent operation may include one or more of a scan operation, a discoverability operation, a radar detection operation, an automotive operation, and/or a soft AP operation.

In one embodiment, the user device may determine to perform operation 422 concurrently with operation 420. In the illustrated embodiment, operation 422 includes performing a discovery operation in the 5 GHz frequency band. Operation 422 may be performed by Reduced Performance PHY/MAC 406. Operation 422 may be performed using a low power radio, such as Low Power LB/HB Radio 414, which may be similar to Low Power LB/HB Radio 214 of FIG. 2. The user device may determine to perform operation 424 concurrently with operation 420 (e.g., subsequent to operation 422). In the illustrated embodiment, operation 424 includes performing a discovery operation in the 5 GHz frequency band. Operation 424 may be performed by Low Performance PHY/MAC Device 406. Operation 424 may be performed using a low power radio, such as Low Power LB/HB Radio 414. Note that each of operations 422 and 424 may be performed using Low Performance PHY/MAC Device 406 concurrently with operation 422 performed using High Performance PHY/MAC Device 404. The user device may determine which radio chain to use for each of operations 420, 422, and 424 dynamically, depending on the determined operation. For example, the user device (or a component of the user device, such as the communications circuity and/or the one or more PHY/MAC devices) may determine which RF chain(s) to use for each of operations 420, 422, and 424, thereby taking advantage of the low power requirements of certain low power operations (e.g., one or more of the concurrent operations discussed above, including a scan operation, a discovery and/or discoverability operation, a radar detection operation, and/or an automotive operation).

It is understood that the above descriptions are for purposes of illustration and are not meant to be limiting.

Figure 5:
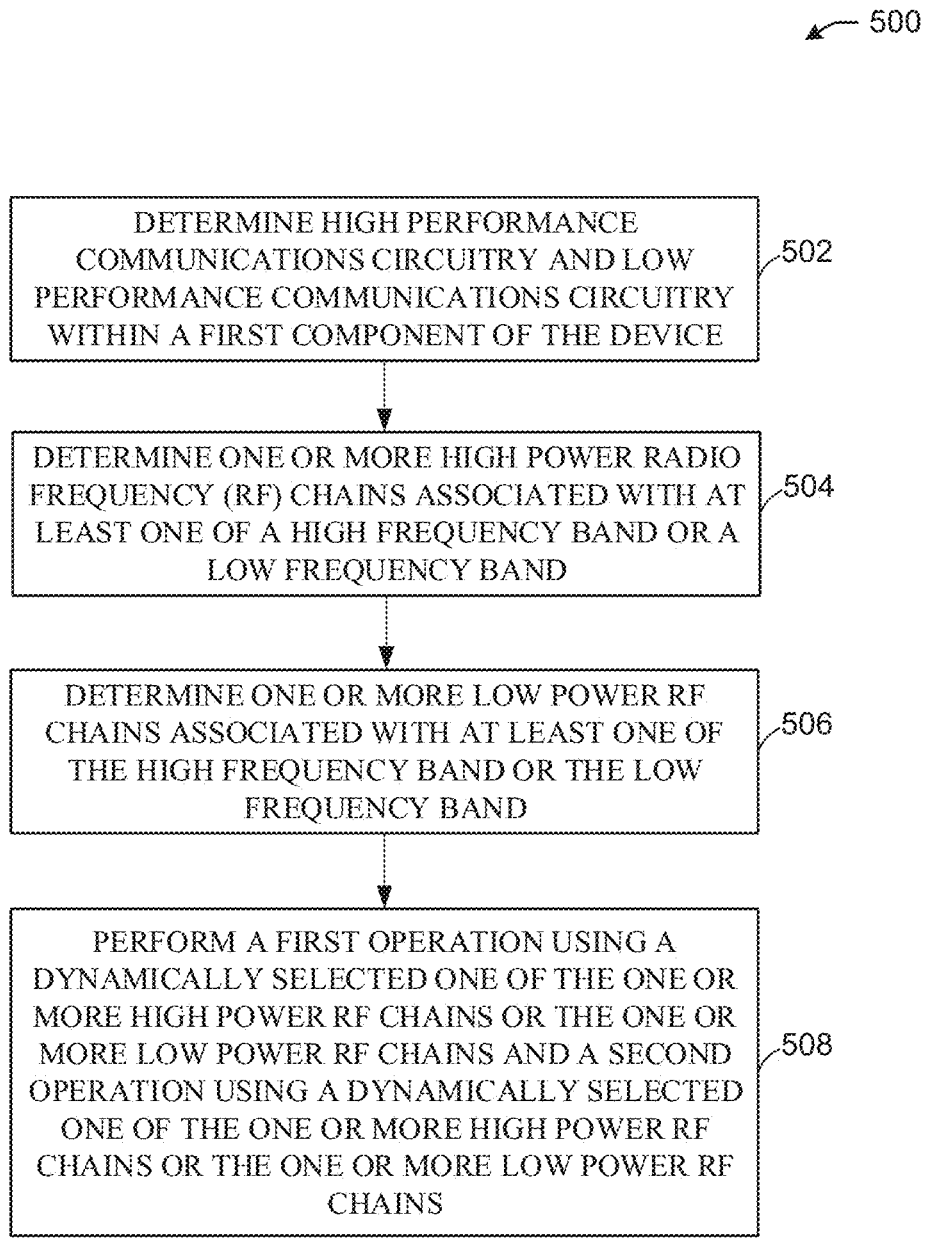
FIG. 5 depicts a flow diagram of an illustrative process for an illustrative efficient concurrent multichannel discovery and reception system, in accordance with one or more example embodiments of the present disclosure.

FIG. 5 illustrates flow diagrams of illustrative processes for an illustrative efficient concurrent multichannel discovery and reception system, in accordance with one or more example embodiments of the present disclosure.

At block 502, a device (e.g., the user device(s) 120 and/or the AP 102 of FIG. 1) may determine high performance communications circuitry and low performance communications circuitry within a first component of the device. The high performance communications circuitry may operate at up to 160 megahertz (MHz). The low performance communications circuitry may operate at up to 40 MHz. The device may further comprise a transceiver configured to transmit and receive wireless signals. The device may further comprise one or more antennas coupled to the transceiver.

At block 504, the device may determine one or more high power radio frequency (RF) chains associated with at least one of a high frequency band or a low frequency band. The high frequency band may be a 5 gigahertz (GHz) frequency band and the low frequency band may be a 2.4 GHz frequency band. The one or more high power RF chains may comprise a first high power RF chain associated with the high frequency band, a second high power RF chain associated with the high frequency band; a third high power RF chain associated with the low frequency band; and a fourth high power RF chain associated with the low frequency band.

At block 506, the device may determine one or more low power RF chains associated with at least one of the high frequency band or the low frequency band. The one or more low power RF chains may comprise a first lower power RF chain associated with the high frequency band and a second low power RF chain associated with the low frequency band. The first low power RF chain may be a 5 GHz low power single receive-only RF chain, and the second low power RF chain may be a 2.4 GHz low power single receive-only RF chain.

At block 508, the device may perform a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently. The first operation may include establishing a first communication session on one of the low frequency band or the high frequency band. The second operation may comprise performing a discovery operation on one of the low frequency band or the high frequency band. The second operation may include one or more of: scanning for a neighboring access point (AP), performing a discovery operation, performing a discoverability operation, performing radar detection, performing a dedicated short-range communication (DSRC) operation, or searching for an alternative channel. The use case may be indicative of one of inter-band concurrency or intra-band concurrency. The second operation may be a low power operation, wherein based at least in part on the performing the second operation, the device may enter a low power state. Entering the low power state may include performing one or more of: setting a low power phase-locked loop (PLL) mode; switching to a dedicated low power PLL; setting a low power analog to digital converter (ADC) mode; setting a low power crystal radio (XTAL) mode; shutting down a medium access control (MAC) PLL; entering a MAC power gate mode; or clock gating at least a portion of a physical layer (PHY) modem.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 depicts a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a multichannel discovery device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The multichannel discovery device 719 may carry out or perform any of the operations and processes (e.g., process 500, etc.) described and shown above.

Multichannel discovery device 719 may allow low power discovery concurrent to regular operation within the same band and/or within a different band using two MAC/PHY devices and a minimal RF Silicon footprint. Multichannel discovery device 719 may allow two MAC/PHY devices to dynamically connect to four RF lineups: two high performance RF lineups, including a 2×2 low band (LB) RF chain and a 2×2 high band (HB) RF chain) and two low power single chain receive-only RF lineups, including a low power LB chain and a low power HB chain. Multichannel discovery device 719 may allow both inter-band dual concurrency and intra-band dual concurrency with a small Si footprint and low power consumption in the required use case while maintaining a good user experience.

Multichannel discovery device 719 may allow for greater flexibility compared to prior dual concurrency systems. Multichannel discovery device 719 may allow any dual concurrency, including both intra-band (e.g., two communication sessions in same band) or inter-band (one communication session in a 2.4 GHz frequency band and one communication session in a 5 GHz frequency band). Multichannel discovery device 719 may allow continuous and/or continual concurrency with a minimal burden on battery power consumption and a good user experience. Multichannel discovery device 719 may enable better battery life compared to prior dual concurrency systems. For example, multichannel discovery device 719 may leverage the additional low power RF chains and flexible architecture to allow the system to always select the lowest power RF chain required by the specific usage scenario, even in non-concurrent use cases (e.g., use cases that require only a single PHY/MAC device, such as unassociated discovery). Multichannel discovery device 719 may allow for a smaller Si footprint for the supported multi-concurrency modes.

Multichannel discovery device 719 may use flexible hardware (HW) to enable a cost efficient, low power solution that enhances common use cases by supporting intra-band and inter-band concurrency without compromising user experience and performance (such as throughput, latency) and also while avoiding known interoperability issues (such as leaving a main connection channel).

Multichannel discovery device 719 may enable a dynamic selection between several RF chains in combination with two MAC/PHY devices. Multichannel discovery device 719 may use the following RF chains: 2×2 2.4 GHz RF high performance chains, 2×2 5 GHz RF high performance chains, a 2.4 GHz RF low power single receive-only chain, and a 5 GHz RF low power single receive-only chain. Multichannel discovery device 719 may use the following PHY/MAC devices: one wide bandwidth (BW) (e.g., up to 80 megahertz (MHz)) PHY/MAC device and one narrow BW (e.g., up to 20 MHz) PHY/MAC device.

Multichannel discovery device 719 may leverage that most of the required concurrency use cases include a device in an unassociated state (e.g., the device performs a concurrent operation that does not entail association with an AP), thus are less time critical by nature. Multichannel discovery device 719 may also leverage that most required concurrency use cases need to support only legacy data receive rates (e.g., using a low modulation and coding scheme (MCS)) or only radar detection, thereby allowing a signal to noise ratio (SNR) trade-off. Multichannel discovery device 719 may enable very low power operation for the discovery uses cases by reducing the requirements from the receive-only RF chains and by enabling the ability to transition from a low power state to an active state in the digital portion of the device (e.g., in the PHY/MAC devices).

Multichannel discovery device 719 may be optimized for dual concurrency by reducing phase noise and liming the BW requirements of the concurrent use cases. This optimization allows for the limiting of RF capabilities of the device. For example, the RF capabilities of the device may be limited by including: a low power phase-locked loop (PLL), which allows phase noise to meet low legacy rates only; a low power crystal radio (XTAL) mode, which allows phase noise required for legacy rates only; and a reduced power analog to digital converter (ADC) mode, which is allowed in narrow BW operations and operations that require a low SNR for discovery.

Multichannel discovery device 719 may enable system level optimizations. For example, using a RF low power single receive-only chain allows a device to leverage a longer response time to allow deeper clock and power management, including clock gating, voltage adjustments, and power domain shut down. Additionally, multichannel discovery device 719 may enable a fast transition from a listen mode to an active mode, for example by using capabilities such as PLL fast lock and fast power domains recover. Due to the flexibility of design, the same mechanism may also be applied in non-concurrent use cases (e.g., in use cases that require a single PHY/MAC device) that require a long use period for low power discoverability, thus optimizing battery life in a single function (e.g., a scan).

It is understood that the above are only a subset of what the multichannel discovery device 719 may be configured to perform and that other functions included throughout this disclosure may also be performed by the multichannel discovery device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FUM), orthogonal FUM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising memory and processing circuitry configured to: determine high performance communications circuitry and low performance communications circuitry within a first component of the device; determine one or more high power radio frequency (RF) chains associated with at least one of a high frequency band or a low frequency band; determine one or more low power RF chains associated with at least one of the high frequency band or the low frequency band; and perform a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

Example 2 may include the device of example 1 and/or some other example herein, wherein the high frequency band is a 5 gigahertz (GHz) frequency band and wherein the low frequency band is a 2.4 GHz frequency band.

Example 3 may include the device of example 1 and/or some other example herein, wherein the one or more high power RF chains comprise a first high power RF chain associated with the high frequency band, a second high power RF chain associated with the high frequency band; a third high power RF chain associated with the low frequency band;
and a fourth high power RF chain associated with the low frequency band.

Example 4 may include the device of example 1 and/or some other example herein, wherein the one or more low power RF chains comprise a first lower power RF chain associated with the high frequency band and a second low power RF chain associated with the low frequency band.

Example 5 may include the device of example 4 and/or some other example herein, wherein the first low power RF chain is a 5 GHz low power single receive-only RF chain, and wherein the second low power RF chain is a 2.4 GHz low power single receive-only RF chain.

Example 6 may include the device of example 1 and/or some other example herein, wherein the first operation includes establishing a first communication session on one of the low frequency band or the high frequency band, and wherein the second operation comprises performing a discovery operation or a discoverability operation on one of the low frequency band or the high frequency band.

Example 7 may include the device of example 1 and/or some other example herein, wherein the second operation includes one or more of: scanning for a neighboring access point (AP), performing a discovery operation, performing radar detection, performing a dedicated short-range communication (DSRC) operation, or searching for an alternative channel.

Example 8 may include the device of example 1 and/or some other example herein, wherein the use case is indicative of one of inter-band concurrency or intra-band concurrency.

Example 9 may include the device of example 1 and/or some other example herein, wherein the second operation is a low power operation, and wherein the memory and processing circuitry are further configured to: based at least in part on the performing the second operation, cause the device to enter a low power state.

Example 10 may include the device of example 9 and/or some other example herein, wherein the causing the device to enter the low power state includes performing one or more of: setting a low power phase-locked loop (PLL) mode; switching to a dedicated low power PLL; setting a low power analog to digital converter (ADC) mode; setting a low power crystal radio (XTAL) mode; shutting down a medium access control (MAC) PLL; entering a MAC power gate mode; or clock gating at least a portion of a physical layer (PHY) modem.

Example 11 may include the device of example 1 and/or some other example herein, wherein the high performance communications circuitry operates at up to 160 megahertz (MHz) and wherein the low performance communications circuitry operates at up to 40 MHz.

Example 12 may include the device of example 1 and/or some other example herein, wherein the operations further comprise performing a third operation using at least one of the one or more low power RF chains with the low performance communications circuitry, wherein the third operation is performed concurrently with the first operation and subsequent to the second operation.

Example 13 may include the device of example 1 and/or some other example herein, further comprising a transceiver configured to transmit and receive wireless signals.

Example 14 may include the device of example 13 and/or some other example herein, further comprising one or more antennas coupled to the transceiver.

Example 15 may include a non-transitory computer-readable medium storing computer-executable instructions which when executed by one or more processors result in performing operations comprising: determining high performance communications circuitry and low performance communications circuitry within a first component of the device; determining one or more high power radio frequency (RF) chains associated with at least one of a high frequency band or a low frequency band; determining one or more low power RF chains associated with at least one of the high frequency band or the low frequency band; and performing a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

Example 16 may include the non-transitory computer-readable medium of example 15 and/or some other example herein, wherein the high frequency band is a 5 gigahertz (GHz) frequency band and wherein the low frequency band is a 2.4 GHz frequency band.

Example 17 may include the non-transitory computer-readable medium of example 15 and/or some other example herein, wherein the one or more high power RF chains comprise a first high power RF chain associated with the high frequency band, a second high power RF chain associated with the high frequency band; a third high power RF chain associated with the low frequency band; and a fourth high power RF chain associated with the low frequency band.

Example 18 may include the non-transitory computer-readable medium of example 15 and/or some other example herein, wherein the one or more low power RF chains comprise a first lower power RF chain associated with the high frequency band and a second low power RF chain associated with the low frequency band.

Example 19 may include a method comprising: determining, by a device, high performance communications circuitry and low performance communications circuitry within a first component of the device; determining, by the device, one or more high power radio frequency (RF) chains associated with at least one of a high frequency band or a low frequency band; determining, by the device, one or more low power RF chains associated with at least one of the high frequency band or the low frequency band; and performing, by the device, a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

Example 20 may include the non-transitory computer-readable medium of example 19 and/or some other example herein, wherein the high frequency band is a 5 gigahertz (GHz) frequency band and wherein the low frequency band is a 2.4 GHz frequency band.

Example 21 may include the non-transitory computer-readable medium of example 19 and/or some other example herein, wherein the one or more high power RF chains comprise a first high power RF chain associated with the high frequency band, a second high power RF chain associated with the high frequency band; a third high power RF chain associated with the low frequency band; and a fourth high power RF chain associated with the low frequency band.

Example 22 may include the non-transitory computer-readable medium of example 19 and/or some other example herein, wherein the one or more low power RF chains comprise a first lower power RF chain associated with the high frequency band and a second low power RF chain associated with the low frequency band.

Example 23 may include an apparatus comprising: means for determining high performance communications circuitry and low performance communications circuitry within a first component of the device; means for determining one or more high power radio frequency (RF) chains associated with at least one of a high frequency band or a low frequency band; means for determining one or more low power RF chains associated with at least one of the high frequency band or the low frequency band; and means for performing a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

Example 24 may include the apparatus of example 23 and/or some other example herein, wherein the high frequency band is a 5 gigahertz (GHz) frequency band and wherein the low frequency band is a 2.4 GHz frequency band.

Example 25 may include the apparatus of example 23 and/or some other example herein, wherein the one or more high power RF chains comprise a first high power RF chain associated with the high frequency band, a second high power RF chain associated with the high frequency band; a third high power RF chain associated with the low frequency band; and a fourth high power RF chain associated with the low frequency band.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   determine high performance communications circuitry and low performance communications circuitry within a first component of the device;
   determine one or more high power radio frequency (RF) chains associated with at least one of a high frequency band or a low frequency band;
   determine one or more low power RF chains associated with at least one of the high frequency band or the low frequency band; and
   perform a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

2. The device of claim 1, wherein the high frequency band is a 5 gigahertz (GHz) frequency band and wherein the low frequency band is a 2.4 GHz frequency band.

3. The device of claim 1, wherein the one or more high power RF chains comprise a first high power RF chain associated with the high frequency band, a second high power RF chain associated with the high frequency band; a third high power RF chain associated with the low frequency band; and a fourth high power RF chain associated with the low frequency band.

4. The device of claim 1, wherein the one or more low power RF chains comprise a first lower power RF chain associated with the high frequency band and a second low power RF chain associated with the low frequency band.

5. The device of claim 4, wherein the first low power RF chain is a 5 GHz low power single receive-only RF chain, and wherein the second low power RF chain is a 2.4 GHz low power single receive-only RF chain.

6. The device of claim 1, wherein the first operation includes establishing a first communication session on one of the low frequency band or the high frequency band, and wherein the second operation comprises performing a discovery operation or a discoverability operation on one of the low frequency band or the high frequency band.

7. The device of claim 1, wherein the second operation includes one or more of: scanning for a neighboring access point (AP), performing a discovery operation, performing radar detection, performing a dedicated short-range communication (DSRC) operation, or searching for an alternative channel.

8. The device of claim 1, wherein the use case is indicative of one of inter-band concurrency or intra-band concurrency.

9. The device of claim 1, wherein the second operation is a low power operation, and wherein the memory and processing circuitry are further configured to:
   based at least in part on the performing the second operation, cause the device to enter a low power state.

10. The device of claim 9, wherein the causing the device to enter the low power state includes performing one or more of: setting a low power phase-locked loop (PLL) mode; switching to a dedicated low power PLL; setting a low power analog to digital converter (ADC) mode; setting a low power crystal radio (XTAL) mode; shutting down a medium access control (MAC) PLL; entering a MAC power gate mode; or clock gating at least a portion of a physical layer (PHY) modem.

11. The device of claim 1, wherein the high performance communications circuitry operates at up to 160 megahertz (MHz) and wherein the low performance communications circuitry operates at up to 40 MHz.

12. The device of claim 1, wherein the operations further comprise performing a third operation using at least one of the one or more low power RF chains with the low performance communications circuitry, wherein the third operation is performed concurrently with the first operation and subsequent to the second operation.

13. The device of claim 1, further comprising a transceiver configured to transmit and receive wireless signals.

14. The device of claim 13, further comprising one or more antennas coupled to the transceiver.

15. A non-transitory computer-readable medium storing computer-executable instructions which when executed by one or more processors result in performing operations comprising:
   determining high performance communications circuitry and low performance communications circuitry within a first component of the device;
   determining one or more high power radio frequency (RF) chains associated with at least one of a high frequency band or a low frequency band;
   determining one or more low power RF chains associated with at least one of the high frequency band or the low frequency band; and
   performing a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

16. The non-transitory computer-readable medium of claim 15, wherein the high frequency band is a 5 gigahertz (GHz) frequency band and wherein the low frequency band is a 2.4 GHz frequency band.

17. The non-transitory computer-readable medium of claim 15, wherein the one or more high power RF chains comprise a first high power RF chain associated with the high frequency band, a second high power RF chain associated with the high frequency band; a third high power RF chain associated with the low frequency band; and a fourth high power RF chain associated with the low frequency band.

18. The non-transitory computer-readable medium of claim 15, wherein the one or more low power RF chains comprise a first lower power RF chain associated with the high frequency band and a second low power RF chain associated with the low frequency band.

19. A method comprising:
   determining, by a device, high performance communications circuitry and low performance communications circuitry within a first component of the device;
   determining, by the device, one or more high power radio frequency (RF) chains associated with at least one of a high frequency band or a low frequency band;
   determining, by the device, one or more low power RF chains associated with at least one of the high frequency band or the low frequency band; and
   performing, by the device, a first operation with the high performance communications circuitry using a dynamically selected one of the one or more high power RF chains or the one or more low power RF chains and a second operation with the low performance communications circuitry using a dynamically selected one of the one or more low power RF chains or the one or more high power RF chains, wherein the dynamic selection is based at least in part on a use case, and wherein the first operation and the second operation are performed concurrently.

20. The method of claim 19, wherein the high frequency band is a 5 gigahertz (GHz) frequency band and wherein the low frequency band is a 2.4 GHz frequency band.

* * * * *